Patented Feb. 21, 1950

2,498,532

UNITED STATES PATENT OFFICE 2,498,532

RUBBERLIKE POLYMERS PLASTICIZED WITH DIBUTYL DIHYDRACRYLATE

Russell T. Dean, Baltimore, Md., assignor to American Cyanamid Company, New York, N. Y., a corporation of Maine No Drawing. Application July 17, 1945, Serial No. 605,643

3 Claims. (Cl. 260—31.8)

This invention relates to the softening or plasticizing of compositions containing natural and synthetic rubber-like polymers and copolymers. In its present form, this application constitutes a continuation-in-part of my copending application for United States Letters Patent, Serial No. 459,821, filed September 26, 1942 now abandoned.

In preparing and using various compositions in the production of manufactured goods from elastomers such as rubber and, more recently, synthetic rubber-like polymers or copolymers, it has been found highly advantageous to employ plasticizers and/or softening agents. Such uses have been generally accepted because of the ensuing reductions in processing time, required equipment, labor, power etc. However, the commercial agents available for the purpose are not wholly satisfactory. Many otherwise useful plasticizers are too costly for general use. Some are difficult to incorporate by milling into the compositions. Some have only a limited compatibility. Some require a more or less extended aging period for the development of maximum plasticity. Some must be removed before the final curing of the rubber composition.

It is, therefore, a principal object of the present invention to develop a new class of materials suitable for use as plasticizers for rubber and synthetic, elastomeric polymers and/or copolymers. These new plasticizers also should be effective elasticators while, at the same time, avoiding in use the principal objections noted above with respect to many of the plasticizers previously available.

In accordance with the present invention it has been found that these and other objects may be quite effectively attained by using as plasticizer and/or elasticator for the elastomeric materials the dibutyl oxydipropionate represented by the structural formula:

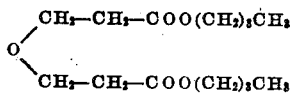

The ester of the present invention may be readily prepared from dihydracrylonitrile. Dihydracrylonitrile is readily prepared from acrylonitrile and ethylene cyanohydrin, using an alkali metal alkoxide or hydroxide as condensing agent, as in the following example which is typical of the procedure. All parts are by weight unless otherwise noted.

EXAMPLE 1

*Preparation of dihydracrylonitrile*

265 parts of acrylonitrile was slowly stirred, over about 3 hours, into a mixture of 355 parts of ethylene cyanohydrin and 2.9 parts of 86% potassium hydroxide in 100 parts of water, the solution temperature being maintained at about 40° C. Stirring was continued at that temperature for about 2 hours after the addition of the acrylonitrile was complete. The solution was then neutralized with 10% hydrochloric acid and subjected to reduced pressure to remove the excess acrylonitrile, water and hydrochloric acid. The precipitated potassium chloride was then filtered from the residue, leave 592 parts, or about 95.2% of the theoretical yield, of crude, orange-colored dihydracrylonitrile.

The nitrile so prepared is wholly suitable for the production of the diester of the present invention. However, if so desired, the crude product may be further purified by vacuum distillation, collecting the fraction distilling between about 115–145° C. at from 0.5 to 1.5 mm. pressure. The degree of purity of course is dependent upon the limitations of the boiling point range and on the uniformity at which the distillation pressure is maintained.

EXAMPLE 2

*Preparation of dibutyl dihydracrylate*

275 parts of concentrated sulfuric acid (96%) was slowly added to a solution of 248 parts of crude dihydracrylonitrile (prepared according to the procedure of Example 1) in about 1300 parts of n-butanol and the mixture was stirred at 80–85° C. for about 3 hours. The temperature was raised to about 115° C. and stirring continued for about 2 hours. Finally, reaction was substantially completed by stirring at 125–135° C. for an additional 3 hours. The reacted mixture was then washed with a large volume of water, allowed to separate into two layers, the ester layer being decanted and subjected to vacuum distillation yielding 261 parts of material boiling from 130–141° C. at 2 mm.

The presence of a strongly acid radical is necessary to the successful conversion of the nitrile to the corresponding acid and diester. In the foregoing examples concentrated sulfuric acid has been used for this purpose. However, the procedure may be modified to use dry HCl gas which in general shortens the reaction time and simplifies the operation. This modified procedure is therefore perhaps to be preferred. The following example illustrates this method.

EXAMPLE 3

*Preparation of dibutyl dihydracrylate*

A reaction vessel was charged with 2000 parts of crude dihydracrylonitrile, 6000 parts of butanol, 3500 parts of benzene, and 610 parts of water, the mixture heated to about 75° C. and dry HCl bubbled therethrough at a rate just sufficient to maintain gentle reflux until the reaction ceased to be exothermic. The reaction mixture was then cooled, filtered, the filter cake washed with 1500 parts of benzene, the benzene added to the filtrate, and the filtrate steam stripped to remove the butanol and benzene, yielding 4250 parts of crude ester. The crude product was then subjected to vacuum distillation and the fraction boiling from 125–165° C. at 2–3 mm. pressure was collected amounting to a 82.8% overall yield having a purity of 97.5%.

The novel ester of the present invention is, as indicated above, an especially effective plasticizer when used in the production of manufactured goods from compositions of elastomeric materials. These rubber-like materials include, for example, vinyl chloride polymers; polymers of olefinic materials containing conjugated double bonds, such as chloroprene polymers and polymerized diolefins; and copolymers of conjugated diolefins with materials copolymerizable therewith containing only a single olefinic linkage. These include, for example, such materials as the "Buna S" or "G. R. S." types of butadiene-1,3-styrene copolymers and the "Buna N" and "Hycar-OR-" types of butadiene-1,3-acrylonitrile copolymers.

The incorporation of the plasticizer with the rubber-like material in making up the compositions may be carried out in accordance with the usual practice during the milling or breaking down period, e. g., on the milling rolls or other commercially-available mechanical working devices and mixers. The amount incorporated in the composition may be quite widely varied. In general it is governed by the particular ester to be used, the degree of toughness of the synthetic rubber-like mass with which it is to be incorporated, the extent to which softening of the latter is desired, and the other properties which it is desired to impart to the composition. In general, the amount will vary from about 5% or less to as much as 50% or more, based on the weight of the elastomeric material contained in the composition.

As illustrative of the incorporation of the plasticizer of the present invention into various compositions in the manufacture of rubber goods from various elastomers, the following examples are typical.

EXAMPLE 4

100 volumes of polymerized vinyl chloride were mixed with 89 volumes of the selected plasticizer. In the first test dibutyl phthalate, a commonly used plasticizer, was taken as standard and in the second dibutyl dihydracrylate was used. The mixture was sheeted on a 6 x 12 laboratory mill at about 115° C., the sheet beginning to form after about one-half minute and the plasticized sheet completed in 6½ minutes. Test sheets were molded in an aluminum mold for 20 minutes at 160° C. The comparative physical properties of the test sheets are shown in the following Table I which clearly shows the remarkable resistance of the material plasticized with dibutyl dihydracrylate to low temperatures.

*Table I*

|  | Dibutyl Phthalate | Dibutyl Dihydracrylate |
|---|---|---|
| Modulus at 100%..........lbs./sq. in.. | 640 | 590 |
| Tensile..................lbs./sq. in.. | 2,150 | 2,025 |
| Elong...........................percent.. | 420 | 445 |
| Shore Hardness.................. | 80 | 82 |
| Brittle Point [1]..................°F.. | −50 | Flexible at −85 |

[1] Temperature at which sample broke when bent through angle of 90°.

EXAMPLE 5

100 parts by volume of polymerized vinyl chloride were mixed in a suitable container with 89 parts by volume of the selected plasticizer. This mixture was gradually fed onto a 6" x 12" open mill, the rolls of which were set tightly together and which were maintained at a temperature of about 115° C. The mixture, after having been passed once through the rolls, was in the form of a flaky product and was returned to the tightly-set rolls until a continuous sheet began to form. The milling of the product was continued with gradual opening of the rolls to allow the mixture to build up a rolling bank of about ¼" diameter. Without additional adjustment of the rolls, the milling was continued until a reasonably translucent sheet of plasticized polyvinyl chloride was obtained and the sheet was removed from the rolls. The total milling period required was noted as the "milling time" and it is obviously desirable that this period of time be as short as possible for economical operation. The sheet removed from the roll was cooled and the cooled sheet was molded in a suitable press for 20 minutes at 160° C. Samples were cut from the molded sheet and these samples were subjected to a series of tests as indicated in the following table in which, for comparative purposes, dibutyl phthalate is set forth as a standard.

*Table II*

| Plasticizer | Milling Time | Solvent Loss Per Cent [1] | Heat Loss Per Cent [2] | Brittle Point [3] |
|---|---|---|---|---|
| Dibutyl phthalate..... | 6½ | 22.3 | 31.1 | °F. −50 |
| Dibutyl dihydracrylate..... | 6½ | 25.9 | 34.9 | Below −85 |

[1] Percent loss in weight of a sample soaked in 70° gasoline for 14 days and dried for 16 hours at 65° C.
[2] Percent loss in weight of a sample after being heated for 14 days in an oven at 100° C.
[3] Temperature at which a sample broke when bent through a 90° angle.

Since dibutyl phthalate is widely used commercially as a plasticizer for polyvinyl chloride, it provides a good standard of comparison. The plasticizer of the present invention imparts to the composition a remarkable resistance to low temperatures. So far as the other physical properties, i. e., elongation, tensile strength and the like are concerned, the plasticizer of the present invention produces as good or better results for all practical purposes than those obtained with dibutyl phthalate.

As was also noted above, the plasticizer of the present invention is particularly useful with sulfur-vulcanizable, synthetic, rubber-like, elastomeric copolymers. Industrially, this is particularly important since many of these compositions cannot be effectively manufactured without the use of some plasticizing agent. In this respect the practice with butadiene-1,3-acrylonitrile copolymers as shown in the following example is typical.

EXAMPLE 6

250 parts by weight of Hycar-OR- (butadiene-1,3-acrylonitrile copolymer) was mixed with 125 parts by weight of the various plasticizers, by milling the mixture on suitable rolls at 50° C. The time required to incorporate the plasticizer was recorded as the incorporation time. The plasticized Hycar was compounded in accordance with the following formula, all parts being by weight:

| | |
|---|---|
| Hycar | 100 } (Plasticized Hycar) |
| Plasticizer | 50 |
| Channel black | 50 |
| Zinc oxide | 5 |
| Sulfur | 1.5 |
| Stearic acid | 1 |
| Phenyl-beta-naphthylamine | 1 |
| Benzothiazyl disulfide | .95 |
| Zinc chloride-di-o-tolylguanidine reaction product | .20 |

After formulation, the batch was allowed to cool overnight and was then re-milled and cooled for about 4 hours. This product was then cured in the form of sheets by heating for 30 minutes at a temperature of 153° C. Illustrative physical properties of the resultant products are contained in the following table:

Table III

| | Incorporation Time | Heat Loss Percent [1] | Impact Resilience [2] | Brittle Point [3] |
|---|---|---|---|---|
| | *Minutes* | | | °F. |
| Dibutyl phthalate | 27 | 25.6 | 45 | −44 |
| Dibutyl dihydracrylate | 27 | 23.8 | 60 | −76 |

[1] Loss in weight after heating for 48 hours in an oven at 150° C.
[2] Reading indicated by the Shore scleroscope, the higher the reading the more resilient the stock, thus indicating that the plasticizer is a good elasticator.
[3] Temperature at which the sample broke on being bent through an angle of 90°.

Mixtures of a natural rubber with one or more of the synthetic rubber-like materials of the kind referred to may also be obtained in a softened condition by the use of the plasticizer of the present invention. Furthermore, natural rubbers may, themselves, be plasticized by milling them with a relatively small amount of the present plasticizer, about 1–10% based on the weight of the rubber being sufficient in most cases.

Where it is desired to obtain mixtures of two or more of the synthetic rubber-like materials described, either with each other or with a natural rubber, such mixtures are preferably prepared by first milling the tougher of the materials with the plasticizing agent so as to bring the same to a condition of softness approximating that of the softer component or components. Additional plasticizers may be added as milling is continued.

The quantity of plasticizers may be varied as well as the temperature and the length of time of mixing. In general, these interrelated factors will be governed by the efficiency of the plasticizer selected as well as by the nature of the natural or synthetic rubber-like materials. The rate of incorporation of the plasticizers may be increased by raising the mixing temperature although it is obviously undesirable to use such temperatures as will have harmful effects on the ingredients of the mixture. Likewise, the size of the batch will effect the mixing time.

The plasticized rubber-like compositions prepared in accordance with the present invention may be used wherever compositions of similar character are now employed. Thus, these compositions may be used in the waterproofing of fabrics as well as in the production of calendered, extruded or molded articles. The compositions may include various fillers, pigments, dyes or the like in accordance with usual practice.

I claim:

1. A plasticized elasticated composition of matter of low brittle point comprising a rubber-like elastomer selected from the group consisting of polymerized vinyl chloride and a 1,3-butadiene-acrylonitrile copolymer, and, as plasticizer and elasticator, an ester of the formula

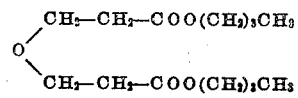

said ester being substantially uniformly dispersed throughout said composition, the weight of said ester being equal to between about 5% and 50% of the weight of elastomeric material in said composition.

2. The composition of claim 1, in which the rubber-like elastomer is polymerized vinyl chloride.

3. The composition of claim 1 in which the rubber-like elastomer is a 1,3-butadiene-acrylonitrile copolymer.

RUSSELL T. DEAN.

REFERENCES CITED

The following references are of record in the file of this patent:

UNITED STATES PATENTS

| Number | Name | Date |
|---|---|---|
| 2,205,420 | Kyrides | June 25, 1940 |
| 2,347,627 | Bruson | Apr. 25, 1944 |
| 2,382,036 | Bruson | Aug. 14, 1945 |

FOREIGN PATENTS

| Number | Country | Date |
|---|---|---|
| 706,547 | Germany | May 29, 1941 |

OTHER REFERENCES

"Hycar O. R." Rubber Age, Feb. 1941, page 316.

Stocklin: Inst. of Rubber Industry, vol. 15, June 1939, page 58.